ated under 35

United States Patent
Alden et al.

(10) Patent No.: US 7,570,166 B2
(45) Date of Patent: Aug. 4, 2009

(54) RFID TRANSPONDER ARRAYS FOR SENSING INPUT AND CONTROLLING PROCESSES

(76) Inventors: Ray M. Alden, 6541 Paces Arbor Cir., #230, Raleigh, NC (US) 27609; Robert Alden, 6541 Paces Arbor Cir., #230, Raleigh, NC (US) 27609

( * ) Notice: Subject to any disclaimer, the term of this patent is extended or adjusted under 35 U.S.C. 154(b) by 26 days.

(21) Appl. No.: 11/369,491

(22) Filed: Mar. 7, 2006

(65) Prior Publication Data
US 2007/0057790 A1 Mar. 15, 2007

Related U.S. Application Data

(63) Continuation-in-part of application No. 11/224,163, filed on Sep. 12, 2005.

(60) Provisional application No. 60/759,084, filed on Dec. 12, 2005.

(51) Int. Cl.
*G08B 13/14* (2006.01)
(52) U.S. Cl. .................. 340/572.1; 340/572.4; 235/375
(58) Field of Classification Search ... 340/572.1–572.8; 235/375
See application file for complete search history.

(56) References Cited

U.S. PATENT DOCUMENTS 6,285,295 B1 9/2001 Casden
6,768,415 B1 7/2004 Tuttle
6,828,902 B2 12/2004 Casden
6,958,711 B2 10/2005 Hauf
7,100,835 B2 9/2006 Selker
2002/0126010 A1* 9/2002 Trimble et al. ........... 340/568.1
2004/0075534 A1 4/2004 Pierce et al.
2005/0076242 A1* 4/2005 Breuer ..................... 713/201
2007/0151809 A1* 7/2007 Tyni et al. .................. 187/391

* cited by examiner

*Primary Examiner*—Eric M Blount

(57) ABSTRACT

The invention described herein represents a significant advancement in systems that enable a user to control systems and input data into a very wide range of systems. User interface devices that comprise an array of input devices such as buttons on a remote control, keys on a computer keyboard, touch screens, and a computer mouse. Such devices comprise an array of individually readable RFID transponders that can be passive or active and whereby user input can be read according the to output state of each individual transponder using RFID techniques. As an information input means, a user may change the RFID signature emitted by individual transponders and in so doing control systems or processes. Transponders can be positioned in physical proximity to graphics or alphanumeric characters and this proximity can be stored in memory such that a user altering a specific transponder represents specific data to a controlled system or memory. Also, the sequence or change or direction of changes in transponders can be used to controlled systems or processes in predetermined ways. Remote controls, computer keyboards, a computer mouse, touch screens and pads created with the present transponder array invention need not use complex circuits and do not require batteries to operate wirelessly.

20 Claims, 7 Drawing Sheets

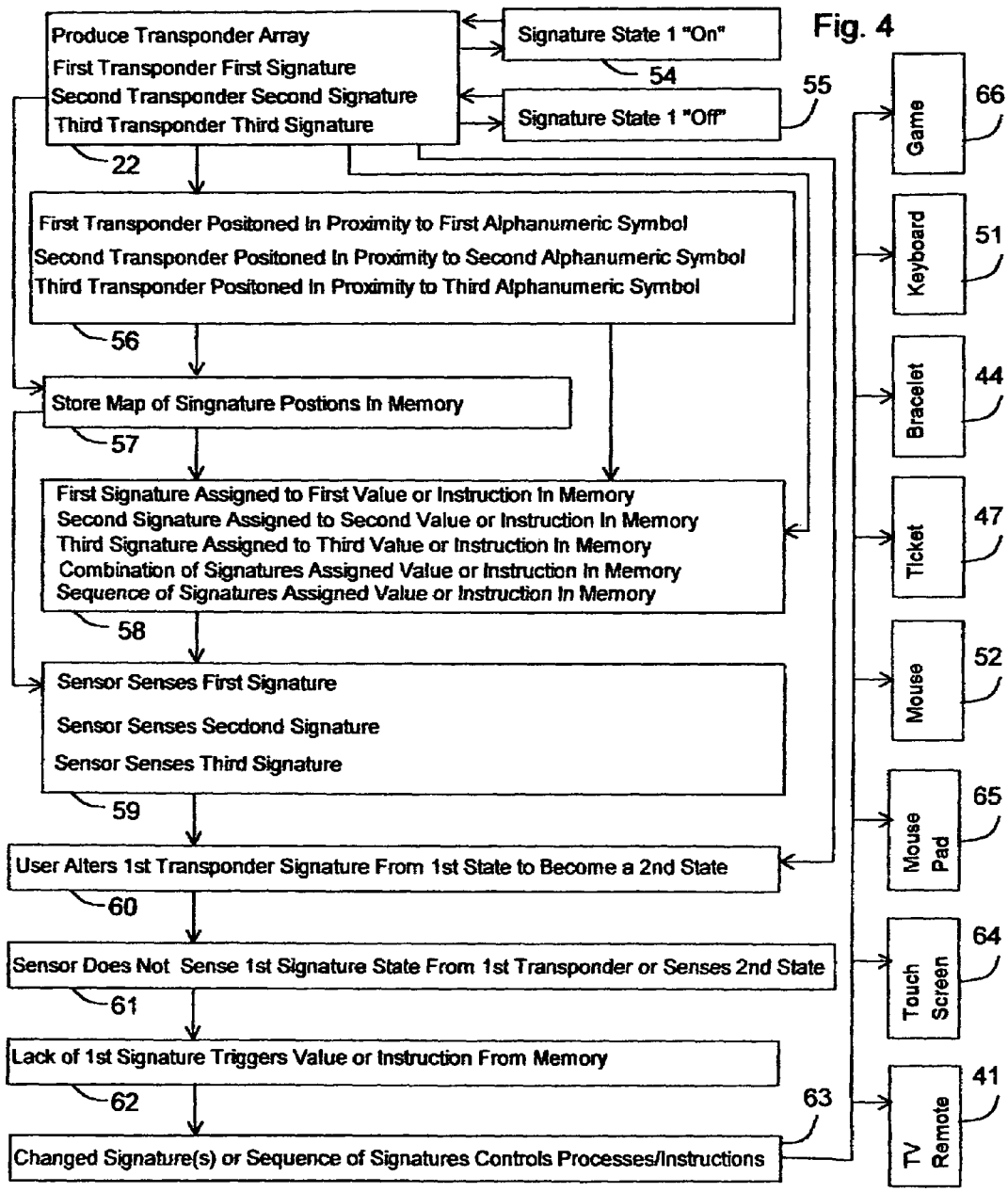

ns in predetermined ways executed by a comparator. Remote controls, computer keyboards, a computer mouse, touch screens and pads created with the present transponder array invention need not use complex circuits and do not require batteries to operate wirelessly.

RFID TRANSPONDER ARRAYS FOR SENSING INPUT AND CONTROLLING PROCESSES

PRIOR AND RELATED APPLICATIONS

This application is a Continuation In Part of U.S. patent application Ser. No. 11/224,163 filed Sep. 12, 2005 and of U.S. Provisional Patent Application No. 60/759,084 filed Dec. 12, 2005.

BACKGROUND FIELD OF INVENTION

The field of invention relates to systems for enabling a user to input information used to control processes. More specifically a system using RFID transponders in array as a user input mechanism. Arrays of sensors in the prior art commonly used as touch screen input devices and RFID transponders in the prior art commonly used in logistics systems. The present invention combining a touch screen like technique with arrays of RFID transponders to provide many objects and advantages.

BACKGROUND—DESCRIPTION OF PRIOR INVENTION

The prior art includes devices that enable a user to input data using arrays of buttons such as on a remote control, or keys on a keyboard, user input devices also comprising touch screens, and a computer mouse. Moreover the prior art incorporates integrated circuits such that such devices can be battery powered to communicate wirelessly via a common emitter of sound or electromagnetic energy. The prior art method for making such devices communicate with an RFID system generally comprises creating an integrated circuit of integrating a plurality of buttons or keys to communicate wirelessly through a single radio transmitter that uses a protocol to communicate the user input through a common RFID emitter. The prior art of the present applicant referenced herein comprises arrays of RFID transponders that function as both sensors and as individual emitters of electromagnetic (RFID) energy. These devices enable a user to input data that can be sensed remotely using RFID. The present invention uses the advantages of the later approach to achieve a wide range of user interface and input devices to perform similarly to the buttons and keys of the prior art except with multiple and significant objects and advantages of the art described herein.

BRIEF SUMMARY

The invention described herein represents a significant advancement in systems that enable a user to control systems and input data into a very wide range of systems. User interface devices that comprise an array of input devices such as buttons on a remote control, keys on a computer keyboard, touch screens, and a computer mouse. Such devices comprise an array of individually readable RFID transponders that can be passive or active and whereby user input can be read according the to output state of each individual transponder using RFID techniques. As an information input means, a user may change the RFID signature emitted by individual transponders and in so doing control systems or processes. Transponders can be positioned in physical proximity to graphics or alphanumeric characters and this proximity can be stored in memory such that a user altering a specific transponder represents specific data to a controlled system or memory. Also, the sequence or change or direction of changes in transponders can be used to control systems or processes in predetermined ways executed by a comparator. Remote controls, computer keyboards, a computer mouse, touch screens and pads created with the present transponder array invention need not use complex circuits and do not require batteries to operate wirelessly.

Thus the present invention offers a significant advancement in the ability to communicate an unlimited range of information in a multiform low cost wireless interface without complex integration problems and without need for batteries.

Objects and Advantages

Accordingly, several objects and advantages of the present invention are apparent. It is an object of the present invention to provide a means to reliably and inexpensively communicate a very wide range information using a wireless technique. It is an object of the present invention to provide a means to reliably and inexpensively communicate a very wide range of user determined information using an RFID technique. It is an object of the present invention to create a data input and communication means for a wide range or uses. It is an advantage of the present invention to eliminate the need for batteries in wireless devices. It is an advantage of some embodiments that they are completely solid state with no moving parts. It is an advantage of the present invention that individual circuits are used and complex integration of circuits together is not required. It is an advantage that something as simple as a sheet of paper with sensors/emitters printed thereon can be used as a data input device replacing something as complicated as a computer keyboard for example.

Further objects and advantages will become apparent from the enclosed figures and specifications.

DRAWING FIGURES

FIG. 4 is a flowchart describing a range of process steps for creation and user operation of RFID transponder based user interfaces for inputting data and controlling systems and processes.

Figure 1:
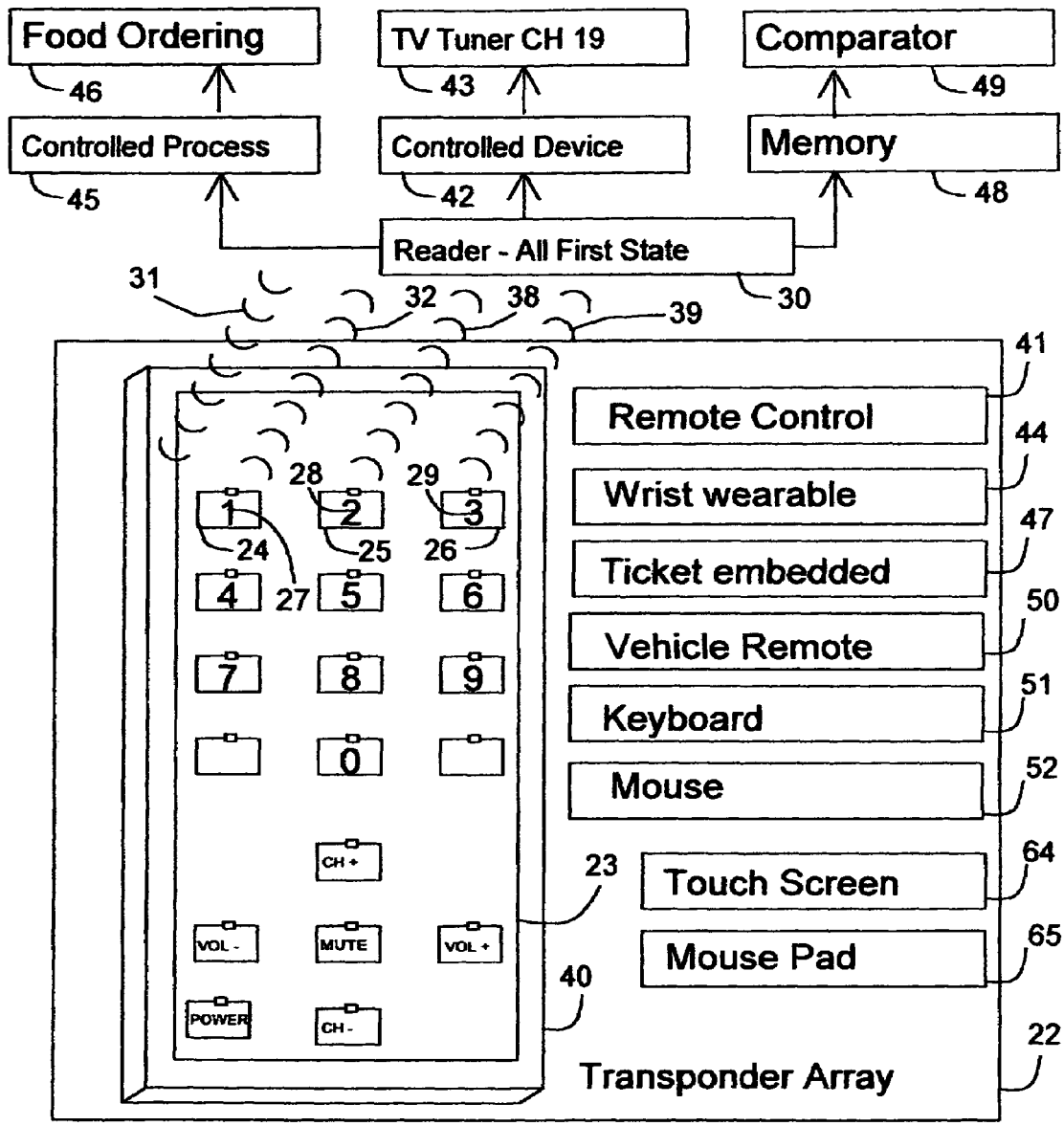
FIG. 1 illustrates an RFID transponder array for operation as a user interface for inputting data and controlling systems and processes.

NUMERALS IN FIGURES 22 wireless readable transponder array
22a first user altered wireless readable transponder array
22b second user altered wireless readable transponder array
23 adhere-able substrate
24 first wireless transponder
24a first user altered wireless transponder
25 second wireless transponder
26 third wireless transponder
26a third user altered wireless transponder
27 first alphanumeric character
28 second alphanumeric character
29 third alphanumeric character
30 reader with first reading
30a reader with first user altered signature state reading
30b reader with second user altered signature state reading
31 reader wireless output signal
32 first wireless signature state from first transponder
32a first user altered wireless signature state from first transponder
38 first wireless signature state from second transponder
39 first wireless signature state from third transponder
39a first user altered wireless signature state from third transponder
40 rigid substrate
41 television remote control user interface
41a user altered television remote control user interface
41b subsequent user altered television remote control user interface
42 controlled device
43 TV tuner
43a user controlled TV tuner
44 wrist wearable wireless user interface
45 controlled process
46 food ordering process/system
47 ticket based wireless user interface
48 memory
48a memory storing first user input alphanumeric data corresponding with proximate symbol
48b memory storing sequence of user input alphanumeric data corresponding with proximate symbols
49 comparator
50 vehicle access remote control user interface
51 keyboard wireless user interface
52 mouse wireless user interface
53 user finger altering first transponder signature state
53a user finger altering third transponder signature state
54 state 1 "on" signature
55 state 1 "off" signature
56 transponders positioned in proximate relationships to graphic symbols
57 store map of signature respective positions or represented symbols in memory
58 store meaning of respective signatures, states, combinations, sequences in memory
59 sensor senses signatures, states, combinations, sequences
60 user alters signature state
61 sensor senses altered signature state or no signature
62 lack of signature or altered state triggers corresponding value or instruction from memory
63 changed signature, state, combinations, sequences controls processes or instructions
64 touch screen user interface on transparent substrate
65 mouse pad user interface
66 game user interface
68 example touch screen sensor RFID transponder
69 printed graphic
70 printed substrate
71 electronic graphic
72 electronic graphic display
73 left click RFID transponder/sensor
74 right click RFID transponder/sensor
75 top scroll RFID transponder/sensor
76 bottom scroll RFID transponder/sensor
77 raised scroll structure
78 mouse ball
79 roller axle
80 transponder array wheel
81 state 1 transponder
82 axis of rotation
83 state 2 transponder
84 transponder state change wheel
85 first mouse pad transponder
86 second mouse pad transponder
87 third mouse pad transponder
88 first mechanical button
89 second mechanical button
91 first transducer in non-readable signature first state
92 first mechanical spring
93 mechanical transponder substrate
94 second transducer in non-readable signature first state
95 second mechanical spring
96 printed graphic on mechanical button
97 mechanical button guide facing

DETAILED DESCRIPTION OF THE INVENTION

Figure 2:
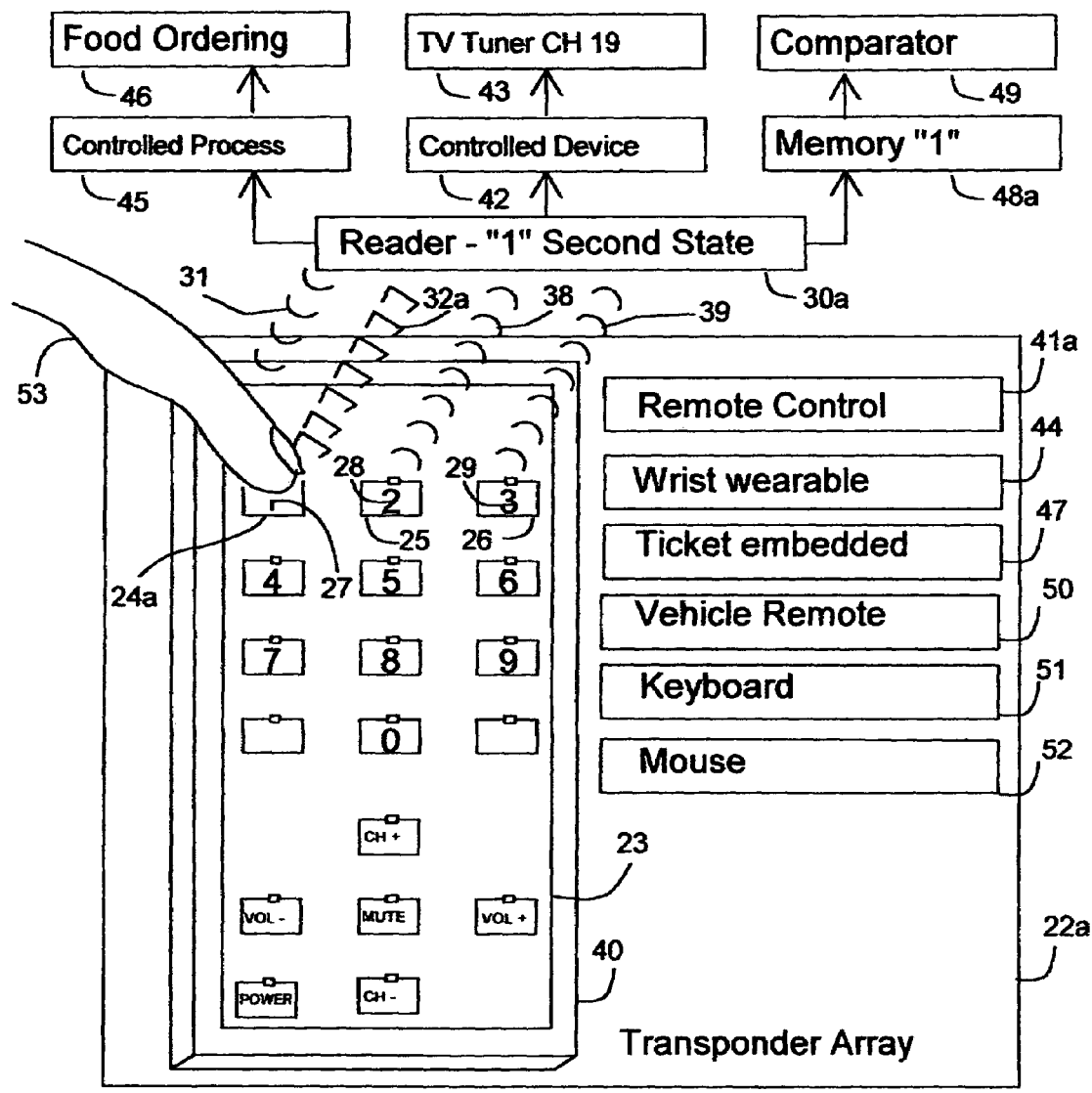
FIG. 2 illustrates the RFID transponder array of FIG. 1 being operated by a user.
Figure 3:
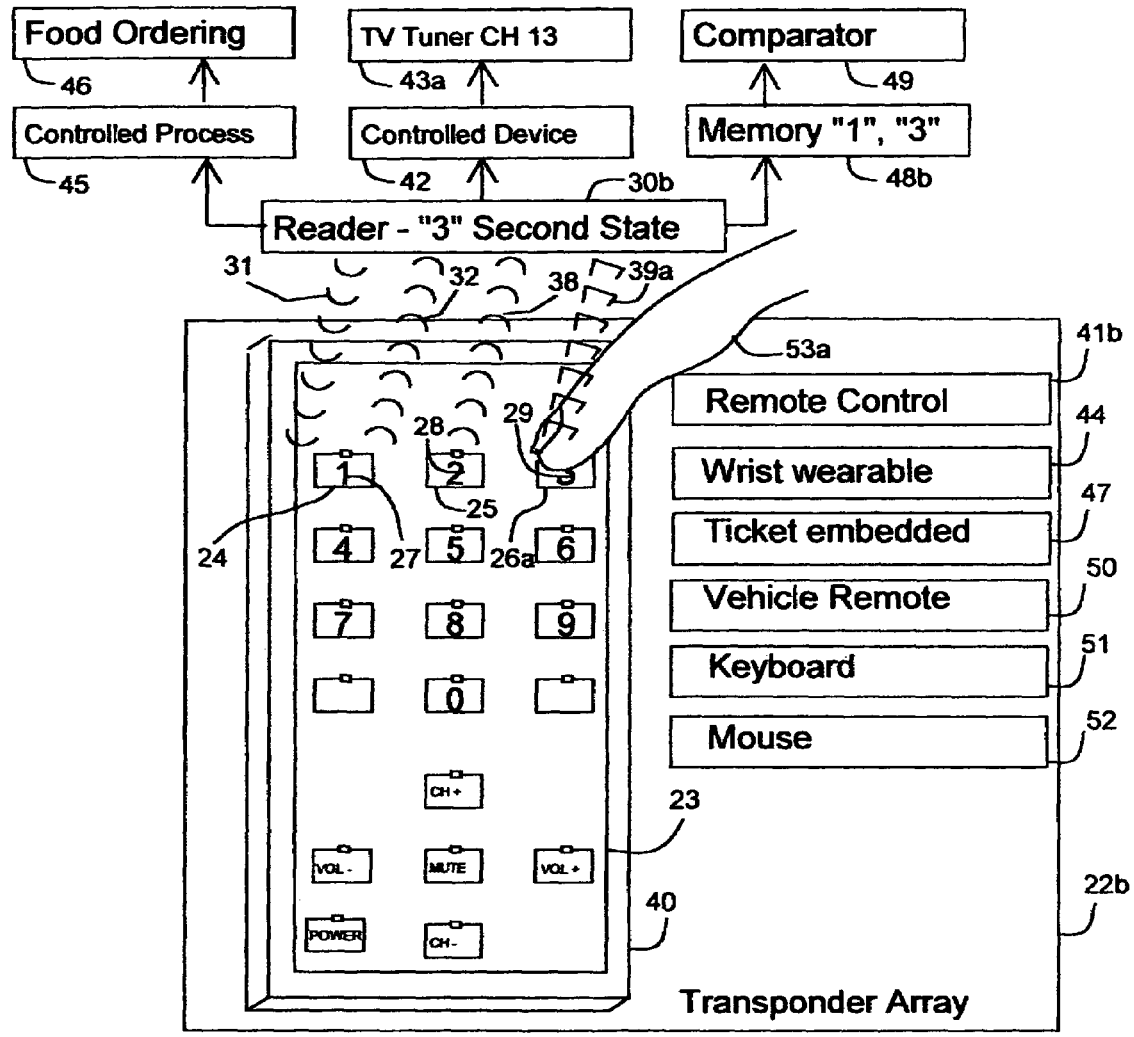
FIG. 3 illustrates the RFID transponder array of FIG. 1 and being further operated by a user.

FIG. 1 illustrates an RFID transponder array for operation as a user interface for inputting data and controlling systems and processes. A wireless readable transponder array 22 is a device that enables a user to input data and control systems and processes. It can take many forms and interface with many applications some of which are listed in FIG. 1 and which are further described herein. An adhere-able substrate 23 comprises a substrate where upon a first surface is printed or adhered an array of RFID transponders and alphanumeric characters and which on a second surface has adherent applied thereto such that it can be adhered to a mounting position. The adhere-able substrate being glued to a rigid substrate 40 that can be a piece of plastic or even wood such that it is comfortable for a user to hold but which is devoid of internal electrical components and batteries common in prior art devices because the only components it needs to operate are the RFID transponders further described herein and which are placed upon the adhere-able substrate. In its essence, the wireless readable transponder array 22 comprises a plurality of RFID transponders each of which can be caused by a user to switch between at least two signature states including a first state that can be read by RFID processes and is stored in a memory and a second signature state which can either be read by an RFID process, or can not be read using an RFID process. As later described, a user is able to input data, and control processes and systems by selectively switching transponders between their respective first signature states and their respective second signature states in a user directed process where each signature state change can be detected remotely through changes in RFID signatures that are read by an RFID reader which is in communication with systems and processes over which the user desires to exercise control. The RFID and connected processes utilize user directed signature state changes in individual transponders, the combination of signature state changes in a plurality of transponders, and a sequence of signature state changes in a plurality of transponders according to predetermined logic and patterns defined in memory as the means to interpret a user's input. An array for the purposes of this document is a plurality of elements that a user can selectively switch between a first signature state and a second signature state. A first wireless transponder 24 is one of an array of RFID transponders that have been affixed to the surface adhere-able substrate 23. According to well known manufacturing processes each transponder may comprise a coil power system, a circuit, a chip, and an antenna so as to produce a respective unique signature either in it's first signature state or in it's second signature state. (Alternate SAW transponders or chipless printed RFID transponders are also known and can be substituted for transponders herein.) According to FIGS. 2 and 3, the transponders are fabricated and positioned such that a user's finger can either become in electrical communication with the transponder or a user's finger can become in close enough proximity to the transponder to alter its signature state, either way, a user can cause the RFID signature state to switch from a first signature state to a second signature state. The difference between an RFID transponder's first signature state and second signature state can comprise a difference in readability (can it be read or not), intensity, frequency, wavelength, or modulation pattern. A second wireless transponder 25 is identical to the first wireless transponder except it is distinctly positioned away from the first by a void space where no transponders are present between transponders and it is capable of producing a signature (either first state or second state) that is distinct from that of the first transponder. A third wireless transponder 26 is identical to the second wireless transponder except it is distinctly positioned away from the second transponder with a void space between it and the other transponders and it is capable of producing a signature (either first state or second state) that is distinct from that of the second transponder. Thus a first wireless signature state from first transponder 32, a first wireless signature state from second transponder 38 and a first wireless signature state from third transponder 39 can be read by an RFID reader as distinct from one another. These distinct signature attributes are stored in memory so that their status can be periodically checked by an RFID reader in an iterative process. Similarly, a plurality of additional transponders are distinctly positioned with space between each and each being capable of producing a unique signature either in its respective first signature state or its second signature state. In one widely useful embodiment, transponders can be positioned in predetermined proximity to alphanumeric characters or other graphical information to facilitate the ability of a user to input data, control processes, or control systems. In such embodiments, the change of a transponder from its first state signature to its second state signature corresponds to a user selecting the alphanumeric character or other graphical symbol as is describe in FIGS. 2 and 3 and ensuing Figures. A first alphanumeric character 27 is printed in physical proximity to the first wireless transponder, a second alphanumeric character 28 is printed in physical proximity to the second wireless transponder, and a third alphanumeric character 29 is printed in physical proximity to the third wireless transponder. In practice, the alphanumeric characters may be printed upon the adhere-able substrate first and then the wireless transponders inlayed thereon or vice versa. A reader with first reading 30 is an ordinary RFID reader that is capable of communicating an RFID signal to and receiving an RFID signal back from passive RFID transponders by construction and processes well known in the prior art. As is also common in the prior art, the RFID reader is integrated with additional systems, comparators, logic, memory, computers and databases such that information it reads can be stored in memory, compared to information stored in memory, and be used to control systems and processes. The reader with first reading 30 emits a reader wireless output signal 31 which is received by the transponder array and is collected by each respective passive transponder's coil to provide the energy for each respective transponder to respond according to RFID communication protocols known in the prior art. Each transponder depicted in FIG. 1 starts in a signature readable first state such that the first wireless signature state from first transponder 32, the first wireless signature state from second transponder 38, and the first wireless signature state from third transponder 39 are all emitted from the transponder array, received by the reader with first reading 30, and compared by the comparator to values in a memory 48. The memory 48 contains a list of all of the transponders respective signatures in the array and the associated character meaning that they respectively convey according to FIGS. 1 and 4. In the embodiments described in FIGS. 5a through 7, the memory may also contain a map of the physical positions of each of the transponders in array. The map is especially useful in the mouse scroller, touch screen, and touch pad (or mouse pad) embodiments since the sequence in which the transponders' signature states are changed is used to determine the physical position of the curser or arrow on a computer screen. In the embodiment of FIGS. 1, 2, and 3, the fact that first state signals are received from each transponder means that the user has not made any selections. As described in FIGS. 2 and 3, this embodiment is counter intuitive since when a user makes a selection, the state two signature created by the affected transponder may no longer be readable by the reader or understandable by the comparator and the comparator uses memory and logic to interpret this lack of signature as a user input. By contrast, the first state signal of the mechanical buttons of FIG. 7 begin as unreadable first state signatures and a user selection renders them as readable second state signatures which are defined in memory and when their second signature state is read, this is interpreted by the comparator as a user input. In FIG. 1, each of the transponders has at least a portion of its circuit, antenna, coil, or other element electronically exposed such that an electrical conductor can be brought into contact with the exposed portion so as to electronically communicate with an individual transponder and in so doing alter the transponder's signature from a first state comprising a first combination of attributes including; readability (can it be read or not), intensity, frequency, wavelength, modulation pattern, etc. to a second state comprising a second combination of attributes including; readability (can it be read or not), intensity, frequency, wavelength, modulation pattern, etc. In an alternate implementation, the transponders do not have any portions electronically exposed but instead their signature's can be altered when a suitable object (such as a metal stylus object that can interfere with the transponder's electric or magnetic fields) is brought in close proximity to an individual transponder selected by the user. The embodiment shown in FIGS. 1 through 3 is directed to controlling a TV and is a television remote control user interface 41 that enables communication to a controlled device 42 such as a TV tuner 43 via the reader 30. It will be understood that many other devices can be similarly operated by a remote control device as taught herein according to user input some example devices include a wrist wearable wireless user interface 44 that a user can wear and through which a user can input information to a controlled process 45 and make selections including from a food ordering process/system 46 for example. Such a wearable transponder array system can be worn by people at amusement parks for example. Similarly, airline flyers can be issued an airline ticket based wireless user interface 47 passenger ticket that makes them both RFID trackable in the airport and enables them to key in important information at checkpoints such as social security numbers for example or to key in food orders at restaurants for example. In the security application, the memory 48 can be used with a comparator 49 to ensure that information the user inputs via the ticket based transponder array checks out according to records in the memory. In the food example, credits can be taken away from an account owned by the ticket holder when they purchase something. Similarly a vehicle access remote control user interface 50 and a computer keyboard wireless user interface 51 can rely upon the art described herein to enable a user to input information to control systems and processes. A mouse wireless user interface 52 can be created according to FIGS. 6a and 6b to interface with a computer system. A touch screen user interface on transparent substrate 64 can be created according to FIGS. 5a and 5b. A mouse pad (or touch pad) user interface 65 can be created according to FIG. 7 to enable a user to control the curser on a computer similarly to touch pads on laptop computers made by SONY but offering the advantage of being much simpler and operating wirelessly and with no batteries needed.

A signature for the purposes of this document comprises the ability of a signal to be sensed and signatures can comprise attributes such as; is it readable (can it be read at all), intensity, frequency, wavelength, or modulation pattern. Specifically, this document describes RFID signatures that can be sensed in a first signature state or a second signature state by an RFID reader and where the reader is in communication with a comparator or memory that contains attributes of specific transponder signatures such that those read by the reader can be distinguished from one another and their being sensed, being altered, or not being sensed can be assigned meaning in the memory or a comparator logic process that can assign meaning to the signatures being read, being altered, or not being read by the reader.

FIG. 2 illustrates the RFID transponder array of FIG. 1 being operated by a user. A user finger altering first transponder signature state 53 touches exposed elements of a first user altered wireless transponder 24a to establish electrical communication therewith and in so doing causes the transponder to transition from a first state signature to a second state signature. Thus a first user altered wireless signature state from first transponder 32a is emitted, it is a second signature state that differs from the first signature state in at least one attribute regarding either a difference in readability (can it be read at all), intensity, frequency, wavelength, or modulation pattern. Note that the first user altered wireless transponder 24a is the only transponder in a first user altered wireless readable transponder array 22a to have been changed from the first state signature condition to a second state signature condition. In alternate embodiments, the user finger altering first transponder signature state 53 may, when in very close proximity to (but not touching) a specific transponder, alter that transponder's signature from the first state to the second state. Alternately an inanimate object such as a stylus can contact the transponder or come in close proximity thereto to cause it to transition from a first signature state to a second signature state. Whether actual contact or proximity is used to alter the transponder the first user altered wireless signature state from first transponder 32a as a result of the user's interaction/input is changed to become a second state that can conform to any one of three conditions in order to be recognized by the reader as a user input. Firstly, the user altered signature state reading 30a (second state of the first transponder) can be read by the reader and recognized as a valid signature that had previously been stored in the memory. Secondly, the user altered signature state reading 30a (second state of the first transponder) can be read by the reader and not recognized as a valid signature that had previously been stored in the memory. Thirdly, the user altered signature state reading 30a (second state of the first transponder) can be not be read by the reader at all (it either comprises an signature outside of the reader's range or no signature at all). In any of these three scenarios, the fact that a transponder's signature has been altered from its first state signature is recognized by the comparator which is frequently checking for an affirming signal from the reader that all of the transponder signals are present in their first state. When a transponder signal is not present in its first state, the comparator in conjunction with the memory determines that the user has input the alphanumeric data associated with the transponder that is no longer in the first signature state. The comparator assigns the value from memory and stores it as a user selection in memory. Thus the comparator selects the first user input alphanumeric data corresponding with proximate symbol 48a interprets and stores the fact that the reader has not detected a first state signature signal from the transponder in close proximity to the "1" alphanumeric character as a "1" user input. The difference between an RFID transponder's first signature state and second signature state can comprise a difference in readability (can it be read at all), intensity, frequency, wavelength, or modulation pattern. In the television control application, a user altered television remote control user interface 41a is created when a user touches a transponder in proximity to an alphanumeric character thus altering the state of the touched transponder to transition from a first signature state to a second signature state and the reader no longer senses the first signature state. The fact that the first signature state is not sensed is detected by the comparator which establishes a "1" in memory corresponding to the alphanumeric character closest to the user altered transponder.

FIG. 3 illustrates the RFID transponder array of FIG. 1 and being further operated by and accepting input from a user. A user finger altering third transponder signature state 53a touches exposed elements of a third user altered wireless transponder 26a to establish electrical communication therewith and in so doing causes the transponder to transition from a first state signature to a second state signature. Thus a first user altered wireless signature state from third transponder 39a is emitted, it is a second signature state that differs from the first signature state in at least one attribute regarding either a difference in readability (can it be read at all), intensity, frequency, wavelength, or modulation pattern. Note that the third user altered wireless transponder 26a is the only transponder in a second user altered wireless readable transponder array 22b to have been changed from the first state signature condition to a second state signature condition. Also, the first user altered wireless transponder 24a has reverted from the second signature state of FIG. 2 back to the first signature state of FIG. 1. In alternate embodiments, the user finger altering third transponder signature state 53a may, when in very close proximity to (but not touching) a specific transponder, alter that transponder's signature from the first state to the second state. Alternately an inanimate object such as a stylus can contact the transponder or come in close proximity thereto to cause it to transition from a first signature state to a second signature state. Whether actual contact or proximity is used to alter the transponder, the first user altered wireless signature state from third transponder 39a as a result of the user's interaction/input is changed to become a second state that can conform to any one of three conditions in order to be recognized by the reader as a user input. Firstly, the reader with second user altered signature state reading 30b (second state of the third transponder) can be read by the reader and recognized as a valid signature that had previously been stored in the memory. Secondly, the reader with second user altered signature state reading 30b (second state of the third transponder) can be read by the reader and not recognized as a valid signature that had previously been stored in the memory. Thirdly, the reader with second user altered signature state reading 30b (second state of the third transponder) can be not be read by the reader at all (it either comprises an signature outside of the reader's range or no signature at all). In any of these three scenarios, the fact that a transponder's signature has been altered from its first state signature is recognized by the comparator which is frequently checking for an affirming signal from the reader that all of the transponder signals are present in their first state. When a transponder signal is not present in its first state, the comparator in conjunction with the memory determines that the user has input the alphanumeric data associated with the transponder that is no longer in the first signature state. The comparator assigns the value from memory which is closest in proximity to the second state transponder and stores it as a user selection in memory. Thus the comparator selects a memory storing sequence of user input alphanumeric data corresponding with proximate symbols 48b interprets and stores the fact that the reader has not detected a first state signature signal from the transponder in close proximity to the "3" alphanumeric character as a "3" user input. Memory now hold the sequence of "1" and "3" as the user selection where upon A user controlled TV tuner 43a changes the television channel to channel "13" in accordance with the user's input into transponders that were sensed wirelessly using passive RFID.

The difference between an RFID transponder's first signature state and second signature state can comprise a difference in readability (can it be read at all), intensity, frequency, wavelength, or modulation pattern. In the television control application, a subsequent user altered television remote control user interface 41b is created when a user touches a transponder in proximity to an alphanumeric character thus altering the state of the touched transponder to transition from a first signature state to a second signature state and the reader no longer senses the first signature state. The fact that the first signature state is not sensed is detected by the comparator which establishes a "3" in memory corresponding to the alphanumeric character closest to the user altered transponder.

FIG. 4 is a flowchart describing a range of process steps for creation and user operation of RFID transponder based user interfaces for inputting data and controlling systems and processes. The transponder array is first fabricated according to well known processes for making RFID tags which are affixed to the surface in a plurality in a predefined manor. A first transponder having a first signature in a first state a second transponder having a second signature in a first state, and a third transponder having a third signature in a first state. Each transponder either having a distinct first state signature or a distinct second state signature the distinction being one or more attributes such as; readability (can it be read at all), intensity, frequency, wavelength, or modulation pattern. Each transponder's first state may be "on" in a state 1 "on" signature 54 step where it is readable. Alternately each transponder's first state may be "off" in a state 1 "off" signature 55 step where it is not readable but will be transitioned to a readable state when the user selects it for input. A transponder's positioned in proximate relationships to graphic symbols 56 step is utilized when as in FIGS. 1, 2, 3, 5a, 5b, and 7 a user input is associated with specific symbols or characters a user desires to input. In such applications, graphical or alphanumeric indicia generally appear in close proximity to transponders that are used to select them. As in the prior art, the present invention embodies devices such as TV remotes, and computer keyboards that enable user's to input data associated with specific button or key selections the novelty here is that these button or key positions are associated with a specific RFID transponder which is the vehicle for communicating the user's selection of that key or button. A store map of signature respective positions or represented symbols in memory 57 step is required to ensure that the transponder associated with a specific key, button, alphanumeric symbol etc. is stored in memory such that when a reader senses that transponder's signature (or doesn't sense that transponder's signature as the case may be) a comparator assigns the proper input that the user intended. Also the 57 step may involve creating an actual transponder position map in memory which is not associated with any specific characters but is useful to track the sequence of transponder signature changes for application in positioning a curser on a computer for example according to the mouse of FIGS. 6a and 6b, and the touch pad (or mouse pad) of FIG. 7. This is consistent with a store meaning of respective signatures, states, combinations, sequences in memory 58. A sensor senses signatures, states, combinations, sequences 59 is the ongoing process whereby a reader establishes a dialog with one or more transponders in the transponder array. The reader interfaces with the comparator which uses information in the memory to determine what signature changes are present and to assign meaning to the changes in signatures. A user alters signature state 60 is the step whereby a user can input data or commands that control systems and processes by changing select transponder signature states. It should be noted that inanimate processes can be monitored and controlled using transponder arrays described herein and in the prior art of the present application referenced herein and incorporated by reference. This application is a Continuation In Part of U.S. patent application Ser. No. 11/224,163 filed Sep. 12, 2005 and of U.S. Provisional Patent Application No. 60/759,084 filed Dec. 12, 2005 which contains descriptions relevant to this application which are not repeated to avoid redundancy but are incorporated herein by reference. A sensor senses altered signature state or no signature 61 step suggests that the user has made a data input selection. A lack of signature or altered state triggers corresponding value or instruction from memory 62 whereby the comparator assigns meaning by using values in memory to describe the meaning of the user's selection. The comparator is used to determine changed signature, state, combinations, sequences controls processes or instructions 63 that may control a wide range of devices according to user input. The user input devices including such things as a touch screen user interface on transparent substrate 64, a mouse pad user interface 65, a game user interface 66, and the other devices referenced on this application. Steps in FIG. 4 having applications to the processes and systems described throughout this application.

Figure 5B:
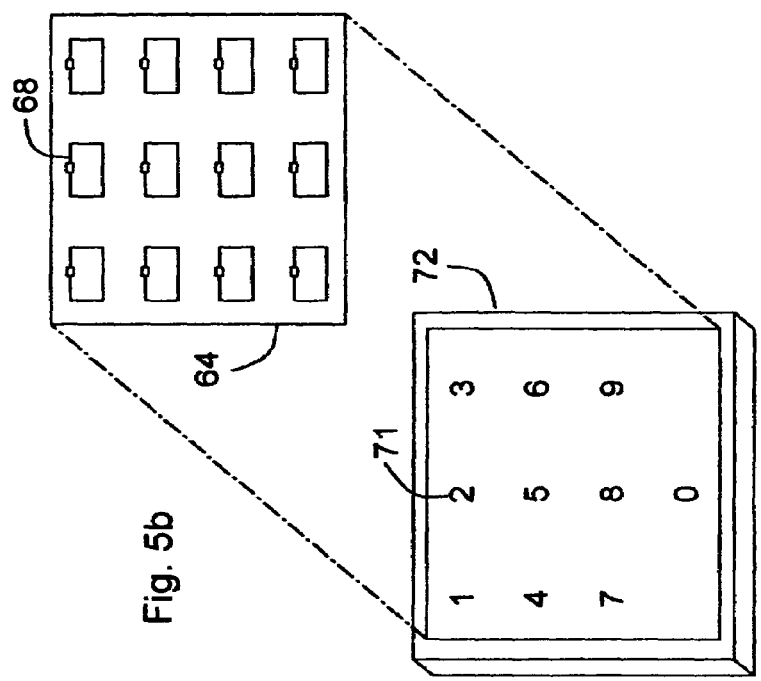
FIG. 5b illustrates an RFID transponder array on transparent substrate for user interfacing with electronically displayed graphics and characters for inputting data and controlling systems and processes.
Figure 5A:
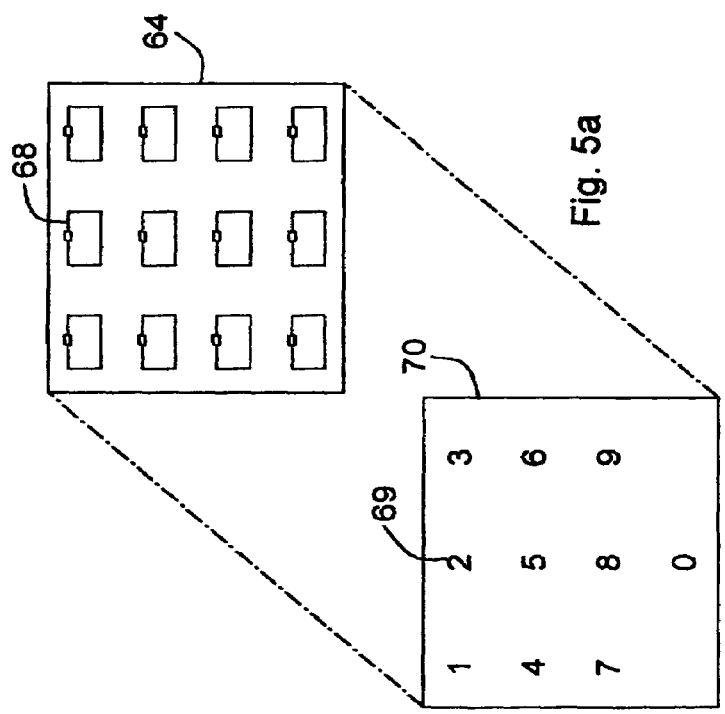
FIG. 5a illustrates an RFID transponder array on transparent substrate for user interfacing with printed graphics and characters for inputting data and controlling systems and processes.

FIG. 5a illustrates an RFID transponder array on transparent substrate for user interfacing with printed graphics and characters for inputting data and controlling systems and processes. The transponders can be a plurality similar in manufacture, operation and function to those described in FIGS. 1, 2, and 3 except that they are deposited upon a touch screen user interface on transparent substrate 64 which is transparent. The advantage of a transparent substrate is that a single transponder array can be used with multiple pictures or devices. For example, the same transponder array is shown in front of a printed substrate 70 having a printed graphic 69 in FIG. 5a and then in front of an electronic graphic display 72 in FIG. 5b. The only thing that needs to change is the map in memory of what graphics or alphanumeric symbols are behind the transparent transponder array such that when a user interacts with the transponder array as a means for inputting data or making selections, the comparator knows what meanings to assign to the user's selections. Thus a single transparent transponder array can represent many different inputs depending upon what graphic it is in front of and as long as the memory is synchronized with the proper graphic with which the user wishes to interact and mapped to the transparent transponder array. As in previous Figures, the transponder array in FIG. 5a comprises a plurality of transponders each with a unique signature in either a first state or in a second state one such transponder being an example touch screen sensor RFID transponder 68.

FIG. 5b illustrates an RFID transponder array on transparent substrate for user interfacing with electronically displayed graphics and characters for inputting data and controlling systems and processes. The transparent transponder array in FIG. 5b operates identically to that in FIG. 5a. The different being that the image and characters can be automatically changed in real-time together with the graphic map in memory such that a first electronic graphic 71 on the electronic graphic display 72 will map to the example transponder 68 at the moment depicted on the screen a user touching the 68 transponder will cause the comparator to enter "2" as a user selected input. At the next instant in time (not shown) a user touching the same transponder 68 when it appears in front of a completely different graphic will cause a completely different interpretation by the comparator which will associate the selection with the new graphics in the scene.

Figure 6B:
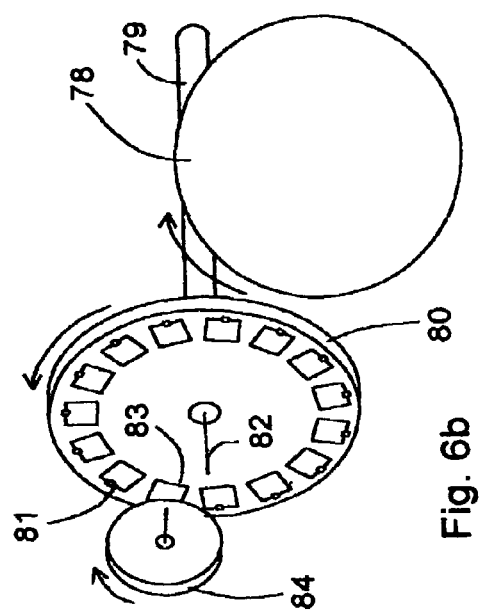
FIG. 6b illustrates an RFID transponder enabled rotating motion transducer.
Figure 6A:
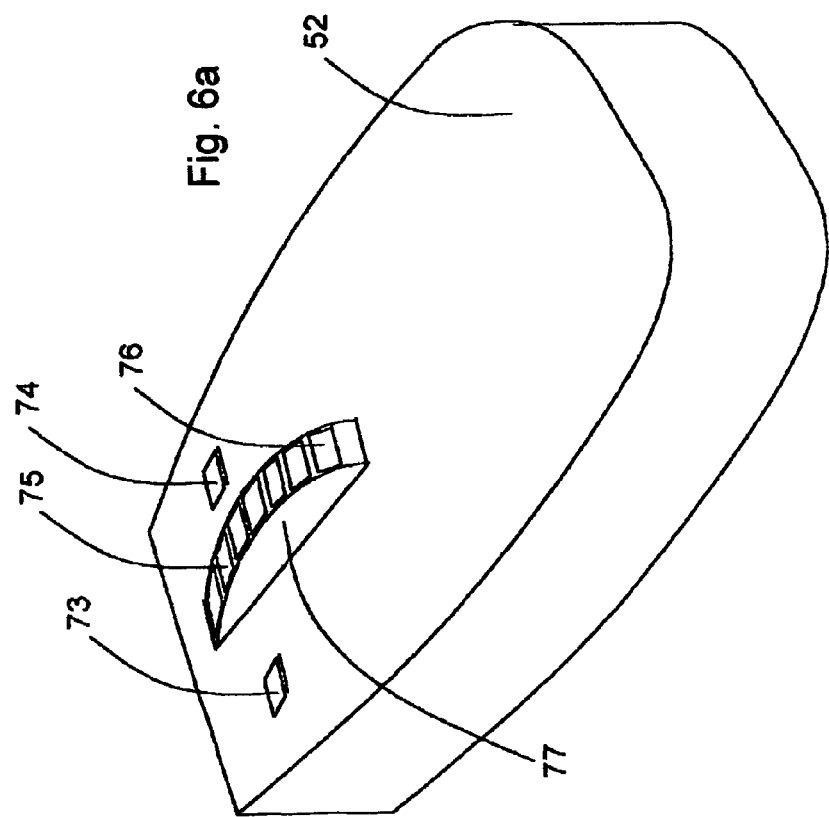
FIG. 6a illustrates an RFID transponder enabled wireless, battery-less mouse for inputting data and controlling systems and processes.

FIG. 6a illustrates an RFID transponder enabled wireless, battery-less mouse for inputting data and controlling systems and processes. The components of a mouse can be readily adapted to the transponder array technique taught above. A left click RFID transponder/sensor 73 is a transponder positioned on the left side of a mouse 52 shaped substrate. When touched by a user, the left click RFID transponder/sensor 73 is caused to change from a first signature state to a second signature state. The RFID reader can sense the change in state and according to instructions executed by the comparator and stored in memory, assigns a left click value to the user's touch. Similarly, a right click RFID transponder/sensor 74 is a transponder positioned on the right side of the mouse 52 shaped substrate. When touched by a user, the right click RFID transponder/sensor 73 is caused to change from a first signature state to a second signature state. The RFID reader can sense the change in state and according to instructions executed by the comparator and stored in memory, assigns a right click value to the user's touch. A raised scroll structure 77 is a rigid bump on op of the mouse 52 that is designed to resemble in shape and operation a scroll wheel but which doesn't actually move. As a user touches a plurality of transponders in succession including a top scroll RFID transponder/sensor 75 and then a bottom scroll RFID transponder/sensor 76, the RFID reader will read the succession of transponder changes from first state signatures to second state signatures and the comparator will interpret them as a user scrolling down on a wirelessly connected computer screen and the computer will accordingly scroll down on the connected computer screen as the user directs. Software for controlling the curser in response to commands from a mouse being well know in the prior art and compatible with the art herein.

FIG. 6b illustrates an RFID transponder enabled rotating motion transducer. A mouse ball 78 is a well known component of many mechanical mousses. As the user moves the mouse, the ball rolls and actuates a roller axle 79 that is connected to a transponder array wheel 80 which is a novel application of a transponder array of this invention. The transponder array wheel 80 having affixed thereto a plurality of transponders similar in production, operation, and function to those previously described herein and having an axis of rotation 82. As the user moves the mouse, a sequence of transponders are caused to transition between a first signature state and a second signature state as they are brought in close communication with or in direct contact with a transponder state change wheel 84. For example, FIG. 6b illustrates a state 2 transponder 83 which the RFID reader can sense has transitioned to a second signature state and the comparator assigns a user scrolling up or down value to depending upon what transponder changes signature state next in the sequence. In the present depiction, a state 1 transponder 81 will be next in succession. Logic and software for interpreting a mouse's moving having been well established in the prior art and being compatible with the art described herein. In practice two such axels and associated elements are used to establish the user's movement commands in two dimensions which are wirelessly transmitted via RFID processes described herein and used to control the curser position on a computer screen.

Figure 7:
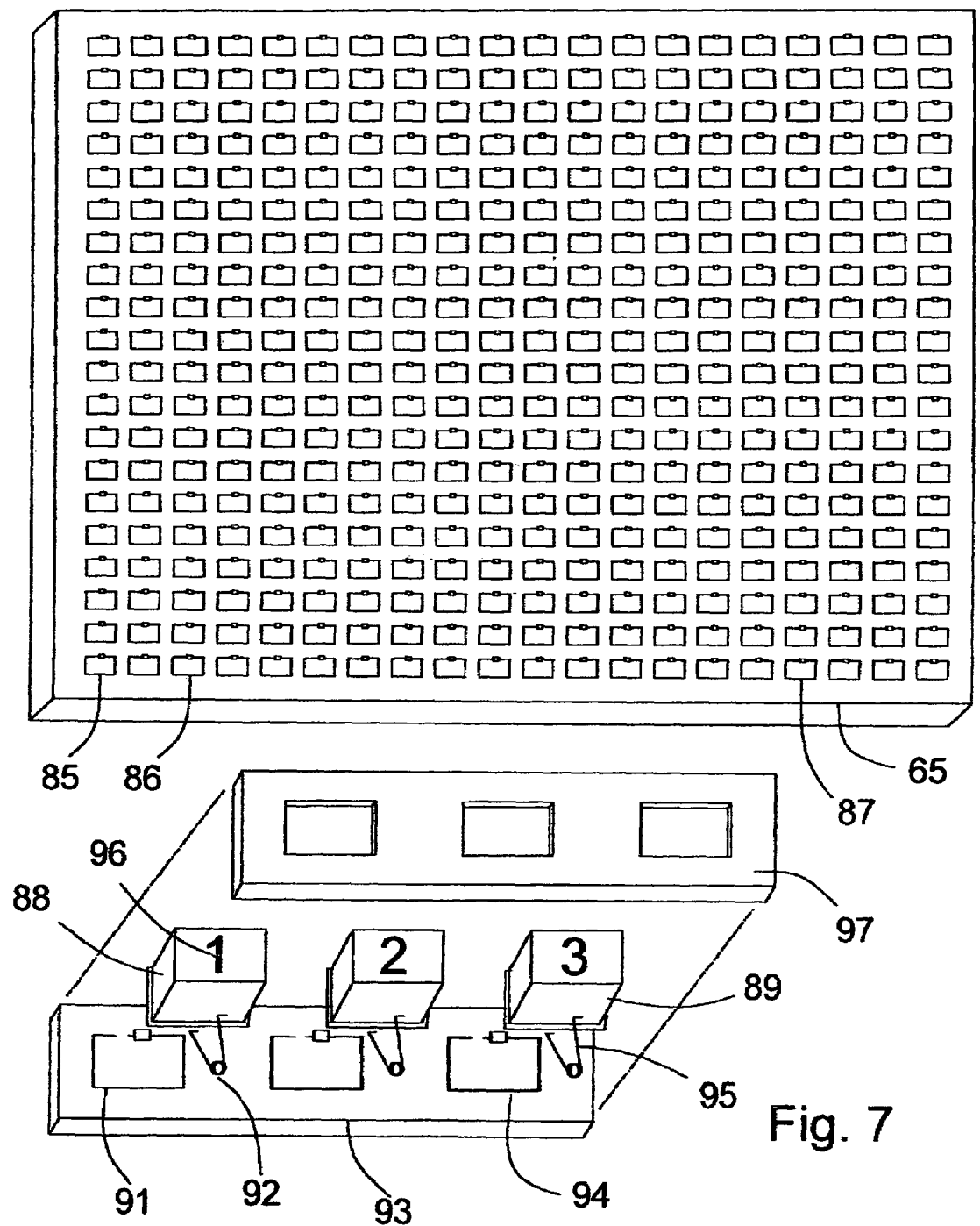
FIG. 7 illustrates a pad based RFID transponder array user interface with a mechanical RFID switch array for inputting data and controlling systems and processes.

FIG. 7 illustrates a pad based RFID transponder array user interface with a mechanical RFID switch array for inputting data and controlling systems and processes. As with laptop computers manufactured by SONY, touch pads (mouse pads) together with a left button and a right button can take the place of a mouse in function. The present invention offering the advantage of being wireless and not requirement batteries. A first mouse pad transponder 85 is in a first signature state, a second mouse pad transponder 86 is in a first signature state, and a third mouse pad transponder 87 is in a first signature state. If a user were to touch the first mouse pad transponder with their finger, a stylus, or another means, and then remain in contact with the 65 mouse pad user interface while moving to the left to touch a plurality of transponders in sequence including the second mouse pad transponder 86 and eventually the third mouse pad transponder 87, the reader would sense this sequence of user to transponder contacts as a succession of changes of transponders from first state signatures to second state signatures and this sensed information would be interpreted by the comparator as a user command to move the curser across the computer screen from the left to the right Software and logic for controlling a curser in response to a user's input into a touch pad being well known in the prior art and having application herein. As for replacing the right and left mouse buttons a first mechanical button 88, and a second mechanical button 89 are positioned in proximity to the mouse pad. A first transducer in non-readable signature first state 91 has a disconnected circuit that illustrate how the first state signature of a transponder may be unreadable. When a user depresses the first mechanical button 88, its lower surface is brought into electrical communication with the first transducer in non-readable signature first state 91 such that its circuit is completed and it is transitioned into its second signature state which is RFI readable and is assigned a left click value in memory. A first mechanical spring 92 will cause the button to revert to its elevated state when the user no longer depresses it. A mechanical transponder substrate 93 has the transponder affixed thereto and together with a mechanical button guide facing 97 contains the buttons. A second transducer in non-readable signature first state 94 similarly operates as above for reporting the user's right clicks and a second mechanical spring 95 ensures the associated right click button will not remain depressed. A printed graphic on mechanical button 96 illustrates that alphanumeric information can be placed upon the buttons of FIG. 7 which when arrayed in greater numbers may operate as a computer keyboard for example. Alternately, the transponders of FIG. 1 can be arrayed in larger numbers to operate a computer keyboard. In either case, the keyboards are wireless and do not require batteries. The mechanical buttons can be fashioned so as to be able to stay depressed if so desired.

Operation of the Invention

Operation of the invention has been discussed under the above heading and is not repeated here to avoid redundancy.

CONCLUSION, RAMIFICATIONS, AND SCOPE

Thus the reader will see that the RFID readable arrays comprising individually switch able elements which can be switched between respective first and second signatures states is an effective means to communicate information wirelessly and without batteries in a very wide range of applications.

While the above description describes many specifications, these should not be construed as limitations on the scope of the invention, but rather as an exemplification of a preferred embodiment thereof. Many other variations are possible for example:

The art described herein uses arrays of individual sensors that are configured to act dually as emitters and while RFID is specified as the technique for wirelessly reading the status of individual elements. It will be understood by those skills in the art that other sensors/emitter elements may be substituted to perform similarly, SAW being on example of user modifiable element that can be arrayed as described herein to be wirelessly readable.

The above description emphasizes the use of passive RFID transducers but active transducers can be substituted.

The above description in most instances starts with RFID transponders that are generally in a readable state comprising a previously defined signature and whereby a user's interaction causes the signature to be transitioned to a second signature state that is either not readable or is otherwise undefined or is a second predefined state. It will be understood that transponders can start in an unreadable state and be transitioned to a readable state by user interaction.

An array of integrated circuit connections that can be read through a single RFID sender has been described by the present applicant in applications which are incorporated herein by reference such as U.S. patent application Ser. No. 11/224,163 and U.S. Provisional Patent Application No. 60/759,084 the integrated circuit connections and associated RFID sender being replaceable by the transponder array described herein.

A user's finger and a mechanical device are each shown as the means that enables a user to alter the signature of a RFID transponder. It will be understood that any means that has the ability to alter the properties of an RFID signal or circuit can be substituted for the user's finger or the mechanical switch described above. An example is a hand held stylus that either comes in contact with an RFID transponder or posses a magnetic or electric field that alters the RF signal of a transponder when brought within close proximity thereto while not actually making contact with the transponder, antenna, or circuit.

The specifications describe a user interface for communicating information via RFID but it is understood that the devices and processes described can collect data from other processes that are not directly user directed. For example the rotating array of transponder elements and processes of FIGS. 6a and 6b can be used in many applications requiring a wireless position transducer. Similarly, the array of elements of FIG. 7 can be used as a position transducer. Thus elements of each Figure have applications for communicating status of conditions other than user selections.

Each of the transponders is described as comprising a coil power system but it is understood that a corporate coil power system is possible or a corporate battery power system is also possible.

Each of the transponders is described as comprising a circuit system but it is understood that a corporate circuit is possible.

Each of the transponders is described as comprising an RFID antenna but it is understood that a corporate RFID antenna is possible.

Each of the transponders is described as comprising a chip but it is understood that a corporate is possible such as in the art of the present application referenced herein. Alternately the chip can be eliminated as is the case with printable RFID transponders known in the prior art.

The difference between an RFID transponder's first signature state and second signature state can comprise a difference in readability, intensity, frequency, wavelength, modulation pattern, or any other discernable or readable difference.

FIG. 4 describes an example of the logic flow of the present invention other sequences and steps are possible when utilizing RFID transponder arrays having elements that can respectively switch between two states as a user interface or to otherwise communicate information.

The transponders described herein as being passive and active transponders can be substituted for any or all of them.

What is claimed:

1. A user input process comprising the steps of;
providing a substrate,
providing and affixing to said substrate at least one wireless energy transmitter,
providing and affixing to said substrate a plurality of switchable elements including a first switchable element in a first state in a first physical position on said substrate, a second switchable element in a first state in a second physical position on said substrate, a third switchable element in a first state in a third physical position on said substrate, and a fourth switchable element in a first state in a forth physical position on said substrate,
providing a memory,
storing in said memory one selected from the group consisting of, a plurality of modulation patterns, a plurality of wireless transmission signatures, and a positional attribute of the physical locations of the switchable elements on said substrate,
providing a wireless energy sensor wherein said wireless energy sensor is in wireless communication with said energy transmitter and said wireless energy sensor is in communication with said memory,
wherein as an input mechanism a user switches in a sequence said first switchable element to a second state and then said second switchable element to a second state,
wirelessly communicating to the transmission sensing means one selected from the group consisting of; the sequence of the switching of the elements, the elements that are in the first state, and the elements that have been switched to the second state, utilizing the wireless communication to assign a meaning to the user's input including at least one selected from the group consisting of; a positional characteristic, a sequence characteristic, a time characteristic, and a directional characteristic.

2. The user input process of claim 1 wherein an information display is provided and upon the display a visible representation of the switched elements is displayed selected from the group consisting of, the switched elements are visibly represented on the display as a trail of pixels representing switched elements differentiated from the pixels representing non-switched elements, and the sequence of switching of elements is visibly represented on said display as a repositioning of a visibly displayed element from a first displayed position on the display to a second displayed position on the display.

3. The user input process of claim 1 wherein the means for switching the elements in sequence is selected from the group consisting of a) rotating of a switching means, b) sliding of a switching means across one selected from the group consisting of; a surface of the substrate, a surface over the substrate.

4. The user input process of claim 1 wherein the switching of elements is wirelessly transmitted at a time selected from the group consisting of; at a time concurrent to the switching of elements, and at a time subsequent to the switching of elements.

5. The user input process of claim 1 wherein an induction means is provided and affixed to said substrate for inducing an electric current which is used to power said wireless transmitter.

6. The user input process of claim 5 wherein said induction means receives a energy wirelessly from said energy sensor and induces said electric current.

7. The user input process of claim 1 wherein said wireless transmitter communicates the state of switchable elements selected from the group consisting of; the wireless energy transmitter communicates the state of only the first switchable element, the wireless energy transmitter communicates the state of only the third switchable element, the wireless energy transmitter communicates the state of the first and the second switchable elements, and the wireless energy transmitter communicates the state of the third and the fourth switchable elements.

8. The user input process of claim 1 wherein said first switchable element subsequently serves as a means for said user to input an alphanumeric character whereby the memory is populated with a plurality of character meanings and wirelessly transmitting the switching of said first element from said first state to said second state is assigned a specific alphanumeric character meaning from said memory.

9. The user input process of claim 1 wherein also provided is a display for presenting a visible display of a first displayed indicia in a first displayed position and the visible display of a second displayed indicia. in a second displayed position further providing that one selected from the group consisting of; a portion of said substrate is transparent wherein said user can see the displayed indicia through said substrate, the display of indicia is positioned in close proximity to said substrate wherein the user can see the displayed indicia in close proximity to the switchable elements, the displayed indicia are displayed on an electric display means wherein the user switches elements on the substrate to navigate through displayed indicia, and wherein the user switches respective elements on the substrate to select between the first displayed indicia and the second displayed indicia.

10. The user input process of claim 9 wherein at a first instance in time, a first meaning in memory is assigned to a user switching said first switchable element and at a second instance in time, a second meaning in memory is assigned to a user switching said first switchable element, and said first meaning in memory corresponds to said first displayed indicia in said first displayed position at said first instance in time and said second meaning in memory corresponds to a third displayed indicia in said first displayed position at said second instance in time.

11. The user input process of claim 1 wherein stored in said memory is a plurality of characters comprising one selected from the group consisting of; character meanings, character maps, character images, character shape attributes, and character modulation patterns.

12. The user input process of claim 11 wherein the user's input is compared to memory to assign a character meaning thereto.

13. The user input process of claim 12 wherein the assigned character meaning is utilized in one selected from the group consisting of; stored as data, utilized in the control of a process, utilized in an alphanumeric based search process, and displayed on an electronic display which is provided.

14. A physical positional and physical motion input process comprising the steps of providing a substrate, providing and affixing to said substrate at least one radio frequency transmission circuit, providing and affixing to said substrate a plurality of user switchable elements including a first switchable element and a second switchable element, providing a memory, storing in said memory one selected from the group consisting of; a plurality of modulation patterns, a plurality of wireless transmission signatures, a map of the user switchable elements, and a positional attribute of the physical locations of the switchable elements on said substrate, providing a radio frequency sensor wherein said sensor is in wireless communication with said transmission circuit and said sensor is in communication with said memory, wherein as a user input mechanism a user selectively manipulates said plurality of switchable elements and thereby modulates a radio frequency transmission from said substrate and wherein said sensor senses the modulation and the sensed modulation is used for comparing the user's manipulations to the memory in a process to assign meaning to the user's manipulation.

15. The physical positional and physical motion input process of claim 14 adding the additional step selected from the group consisting of; a) wherein when the user switches the first element and then the second element, a meaning in memory denotes a first direction of movement and wherein when the user switches the second element and then the first element, a meaning in memory denotes a second direction of movement, b) wherein the user's switching of the first element in physical space is assigned a meaning corresponding to a first position of a displayed visible element and wherein the user's switching of the second element in physical space is assigned a meaning corresponding to a second position of the displayed visible element, and c) a first time dimension is recorded corresponding to when the user switches the first element and a second time dimension is recorded corresponding to when the user switches the second element.

16. The physical positional and physical motion input process of claim 15 wherein as the mechanism to switch elements, the user is provided and controls at least one element selected from the group consisting of; rotating element, pen, pencil, stylus, mouse, finger, hand, keypad, keyboard, touch screen interface, mouse pad, and button.

17. The physical positional and physical motion input process of claim 15 wherein also provided is a display for presenting a visible display of a first displayed indicia in a first displayed position and the visible display of a second displayed indicia in a second displayed position and further providing that one selected from the group consisting of; a portion of said substrate is transparent wherein said user can see the displayed indicia through said substrate, the display of indicia is positioned in close proximity to said substrate wherein the user can see the displayed indicia in close proximity to the switchable elements, the displayed indicia are displayed on an electric display means wherein the user switches elements on the substrate to navigate through displayed indicia, and wherein the user switches respective elements on the substrate to select between the first displayed indicia and the second displayed indicia.

18. The physical positional and physical motion input process of claim 14 wherein said substrate is affixed to a changeable display of indicia which is provided and wherein the user switches said first element having physical proximity to said indicia and thereby invokes a first desired assigned meaning in memory corresponding to the indicia.

19. The physical positional and physical motion input process of claim 18 wherein when a second indicia is displayed and the user switches said first element a second desired assigned meaning in memory is invoked.

20. The physical positional and physical motion input process of claim 14 wherein a second substrate is provided and said first substrate rotates relative to said second substrate and the rotational movement causes said first element to switch from said first state to said second state.

* * * * *